… … …

United States Patent Office 3,437,619
Patented Apr. 8, 1969

3,437,619
STABLE COMPOSITIONS OF HYDRAULIC CEMENT AND POLYMERIZABLE UNSATURATED POLYESTER RESIN COMPONENTS COPOLYMERIZABLE BY THE MERE ADDITION OF WATER, AND METHODS OF PRODUCING SAME
William Owen Nutt, Warlingham, England, assignor to Cement Marketing Company Limited, London, England, a corporation of the United Kingdom
No Drawing. Continuation-in-part of applications Ser. No. 317,154, Oct. 18, 1963, and Ser. No. 672,423, Sept. 29, 1967. This application Jan. 4, 1968, Ser. No. 695,548
Claims priority, application Great Britain, Oct. 19, 1962, 39,644/62
Int. Cl. C08f 45/04, 43/00
U.S. Cl. 260—22              22 Claims

ABSTRACT OF THE DISCLOSURE

A polymeric cementitious composition is prepared by adding water to a substantially water-free copolymerizable mixture comprising polymerizable, unsaturated polyesters obtained by reacting polycarboxylic acids or anhydrides thereof and polyhydric alcohols or aliphatic oxides, wherein at least one of the reactants contains ethylenic unsaturation; at least one monomeric ethylenic unsaturated crosslinking agent compatible with the polyesters; hydraulic cement; and a water-soluble free-radical-forming co-polymerizable initiator which is substantially insoluble in the crosslinking agent and polyester but is effective for initiating the copolymerization of the monomer and polyesters under aqueous alkaline conditions. The mixture may also include an activator such as a reducing agent. Prior to adding water thereto, the mixture is stable in non-copolymerized condition for long periods of shelf life.

---

This application is a continuation-in-part of the application of William Owen Nutt, Ser. No. 672,423 filed Sept. 29, 1967 for Stable Compositions of Hydraulic Cement and Resin Components Copolymerizable by the Mere Addition of Water, and Methods of Producing Same, now abandoned, which application is, in turn, a continuation of the application of William Owen Nutt, Ser. No. 317,154 filed Oct. 18, 1963 for Stable Compositions of Hydraulic Cement and Resin Components Copolymerizable by the Mere Addition of Water, and Methods of Producing Same, now abandoned.

The present invention concerns compositions of synthetic resin polymers of three-dimensional type and particularly the formation of such polymers by free radical initiation. More particularly the invention is concerned with compositions of such polymers with hydraulic cement.

It is an object of the invention to provide compositions containing hydraulic cement in which such polymers are crosslinked in the presence of water.

A further object of the present invention is the production of cement compositions which will provide concrete and other cement products having considerably improved strength.

Compositions are known which contain polymerizable constituents, such as polyesters and monomers possessing ethylenic unsaturation, wherein hydraulic cement has been incorporated as a filler material. The use of such cementitious compositions has been somewhat limited because of the difficulties encountered in obtaining satisfactory properties when water is added to the cement.

The invention is based on the discovery that three-dimensional organic polymers can be satisfactorily produced by free radical initiation of polyesters by water-soluble agents in an aqueous medium in conjunction with the simultaneous hydration of cement to obtain new and highly useful cementitious products.

According to the present invention a method for producing a cementitious composition comprises copolymerizing a polymerizable polyster with a polymerizable ethylenically unsaturated monomer compatible with said polyester, in the presence of hydraulic cement and a water-soluble polymerization initiator which is insufficiently active in the polymerizable constituents present to initiate their polymerization but becomes active under aqueous alkaline conditions, i.e. at a pH above 7, preferably 8.5. According to a further feature of the invention, copolymerization is brought about by adding water to the mixture of cement and polymerizable polyester and said unsaturated monomer in the presence of said initiator, whereby polymerization takes place by free radical initiation and the cement is hydrated.

The invention also includes within its scope the aforesaid compositions comprising the polyester and the said unsaturated monomer together with a water soluble free radical initiator and hydraulic cement.

The expression "cement" when used herein is to be understood to refer preferentially to Portland cement such as is obtained by the heat treatment of a mixture of chalk (or other calcareous earth compound) and clay (or other silicaceous earth compound) but may also include any inorganic substance which is hydraulic (i.e. which on mixing with water at ambient temperature reacts to produce a crystalline lattice structure exhibiting a degree of mechanical stability and/or physical strength). Other hydraulic substances suitable for use in the present invention include high alumina cements, blast furnace cements, lime-pozzolana cements, compounds or mixtures containing these cements. An essential condition is that the cement should, on being mixed with water, exhibit or induce an alkaline reaction, preferably but not exclusively caused by calcium hydroxide.

The cement can be of any colour and ground to a powder having a surface area of from 1,000 to 10,000 square centimetres per gram at the time of incorporation with the polyester resin and monomer. It may be found advantageous to so treat the cement that some of its chemical or physical properties are altered to provide dispersion stability in the polyester resin and monomer. As an example of such treatment found beneficial in the present invention, Portland cement which has been milled with a fatty acid such as stearic acid produces more stable dispersions in polyester resin and monomer than the product prior to such treatment. Additionally, the described treatment of cement with a fatty acid provides an oleophilic coating to the particles of cement which improves the efficiency with which the cement disperses when added to the polyester resin and monomer. For example, a Portland cement is employed which has been milled with a fatty acid of the stearic acid type.

The polyesters which may be employed according to the invention are unsaturated polymerizable polyesters. The production of such unsaturated polymerizable polyester resins from a wide variety of starting components is well known from the literature. They are prepared by polycondensation of a polycarboxylic, principally dicarboxylic acid with a polyhydric, mainly dihydric alcohol, or with an aliphatic oxide such as an alkylene oxide, one of these components containing polymerizable ethylenic unsaturation, preferably the acid and especially an α, β-unsaturated α, β-dicarboxylic acid. The unsaturated acid may be partly replaced for instance by a saturated polycarboxylic acid. Saturated or unsaturated hydroxy acids may also be employed. Condensation is continued until the acid number of the polyester resin has fallen to a desired value. Particularly suitable resins in accordance with the present invention have acid values of from 10 to 50 milligrams of potassium hydroxide per gram. The degree of condensation may be varied by incorporating monofunctional carboxylic acids or alcohols in the condensation. It is preferred to use a mixture of a saturated dibasic acid and unsaturated dibasic acid together with a glycol or other polyhydric alcohol. Suitable acids from which such a mixture may be obtained include maleic, fumaric, phthalic and isophthalic acids and their anhydrides and suitable alcohols include ethylene glycol, diethylene glycol, propylene glycol, hexylene glycol, and pentaerythritol. The polyester is normally produced and dissolved in a solvent such as a monomeric vinyl compound. In carrying out the present invention, this solvent may be the polymerizable ethylenically unsaturated monomer required as described above for the production of the copolymer. One or more monomeric polymerizable ethylenically unsaturated compounds may be polymerized in admixtures with one or more of the polyester resins. Suitable monomeric compounds are well known from the literature and include a wide variety of monomeric vinyl and substituted vinyl compounds such as vinyl esters, the esters of acrylic and methacrylic, maleic and fumaric acids, allyl compounds and vinyl aromatic compounds such as styrene and vinyl toluene. Thus, unsaturated monomers which can be used as the cross-linking agent include vinyl esters such as vinyl propionate, vinyl ethers, vinyl ketones etc. and the derivatives of the free acids, e.g. of acrylic acid. The allyl compounds may include, for example, the allyl esters of saturated or unsaturated mono- or polycarboxylic acids, such as diallylphthalate, diallylmaleate, and the allyl ethers of mono- or poly-alcohols, etc.

The preferred polyester is made by esterification of a mixture of phthalic anhydride and maleic anhydride with an equivalent proportion of the glycol, the product being condensed to produce a viscous polymer at room temperature. Polyester resins employed in this invention can utilize a grade of polyethylene glycol of average molecular weight of 1000 with an upper molecular weight limit of 1050 and a lower molecular weight limit of 950, and a grade of polypropylene glycol of average molecular weight 1025 with an upper molecular weight limit of 1075 and a lower molecular weight limit of 975.

As is common to the art it is usual to incorporate a proportion of inhibitor in both the polyester resin and the monomer. The inhibitor is present to prevent premature copolymerization of the polyester resin and/or monomer during storage but does not prevent initiation by a substantial proportion of free radicals. Typical inhibitors are organic reducing agents soluble in either polyester resin or monomer, for example hydroquinone, tertiary butyl catechol, and the mono-methyl ether of hydroquinone.

When such polyesters as described above are mixed with the aforesaid unsaturated monomers and polymerized by free radical initiation, a three dimensional structure is formed. It will be apparent that in the resulting copolymer a proportion of unreacted carboxyl groups remains in the polymer chain.

In carrying out the present invention a mixture is made of polyester resin, unsaturated monomer such as styrene together with cement. The polymerization initiator is dispersed in this mixture.

Polyester resins and monomers have hitherto ordinarily been caused to copolymerize by the addition of free radical-forming compounds. Typical free radical-forming compositions are organic peroxides and azo compounds. The peroxides have been used in association with activators, for example metal compounds soluble in organic solvents, in particular compounds of the metals lead, manganese, cobalt, iron and chromium or also tertiary amines, or as components of redox systems.

All of the above mentioned ordinary initiator systems rely for their effect on being soluble in the monomer and/or in the polyester resin.

In the present invention the free radical-forming compounds are not soluble in the monomer and/or polyester resin but are present as a fine particulate dispersion in the monomer and polyester resin. As with the ordinary initiators described above, the free radical-forming compounds employed in carrying out this invention may comprise oxygen-rich compounds on the one part and reactants with these on the other part. Thus, the salts of per acids may be used as initiators and sulphites used as activators, the two producing a redox catalysis system such as is described by e.g. C. E. Schildknecht in "Vinyl and Related Polymers" (Publ. John Wiley, 1952), p. 93, Chapter II. The reducing agent is, however, not essential in this invention, the salts of per acids being capable of acting as initiators in the presence of Portland cement without an added activator. Particularly suitable are the water-soluble salts of persulphuric acid, especially ammonium, sodium and potassium persulphates.

The activator, if used, may be any suitably stable reducing agent and sodium meta bisulphite is typical, being the preferred, but not restricted, compound.

Other activating materials such as cobalt naphthenate may also be present with any other desired conventional additives, such as waxes, etc.

A composition for forming a cement product according to the present invention is expediently made by dispersing the initiator and activator in the form of fine powders into a solution of the polyester in the unsaturated monomer and cement is then also dispersed in the mixture by stirring. Suitable compositions may contain for instance the following:

| | Parts by weight |
|---|---|
| Polyester resin | 50 to 70 |
| Unsaturated monomer | 25 to 65 |
| Powdered ammonium persulphate | 3 to 5 |
| Powdered sodium bisulphite | 1 to 3 |
| Portland cement | 80 to 150 |

The foregoing mixture remains a workable paste for a period which, for any specific polyester resin, depends upon the free lime content of the Portland cement. The higher the free lime content, the shorter the period for which the mixture remains free flowing.

The aforesaid mixture becomes reactive upon addition of water. Water is readily stirred in and is believed to dissolve the initiator system which initiates polymerization between the polyester resin and the unsaturated monomer e.g. styrene, and also hydrates the cement.

For the purposes of this invention the hydraulic cement content, expressed as a percentage by weight of the combined polyester resin and monomer, may be varied within wide limits, for example from 2% to 200%.

Increasing cement content has been found to increase:
  (1) Young's modulus,
  (2) Surface hardness,
  (3) Adhesion to substrates,
  (4) Temperature rise during reaction,
and found to decrease:
  (1) Flexural strength,
  (2) Shrinkage,
  (3) Pot-life of the mixture,
  (4) Workability of the mixture.

For the majority of practical applications the preferred cement/polymer ratio corresponds to 8–40% by volume of cement in the cement and polyester/monomer mixture. This is equivalent to 15–65% cement by weight in the mixture, about 40% being the best all round proportion.

The quantity of water used to hydrate the cement and thereby initiate polymerization of the polyester resin and monomer is variable within limits. It has been found that the ideal water content is in the region of 25% by weight based on the cement. The minimum water content is about 5% by weight based on the cement. The addition of more than 25% of water is also possible but lower strength products are formed.

The aforesaid composition may be used as a binder to produce concrete in the same general way at Portland cement. The composition is used for instance together with water, in place of cement and water, in normal concrete mixes. Whereas a normal concrete, made from 1 part cement, 2 parts sand and 3 parts aggregate by weight, possesses a compression strength of about 550 lbs. per square inch after 24 hours aging, a similar mix based on the composition according to the invention gives a corresponding figure of 2750 lbs. per square inch. The tensile strength is also increased by the invention. A normal Portland cement paste gives a product having a value of about 350 lbs. per square inch whereas the composition of the invention gives a product with a strength of 650 lbs. per square inch when tested after 24 hours aging.

A mortar of one part cement to three parts sand normally has a tensile strength of 170 lbs. per square inch after 24 hours whereas the same ratio of the composition of the invention with sand yields a product with a tensile strength of 350 lbs. per square inch.

Further examples of practicing the invention, and the results obtained are set forth below in additional examples. The products of these examples are unsaturated polyester/unsaturated monomer/hydraulic cement/water soluble initiator compositions which are essentially stable at ambient temperatures (5–25° C.) in the absence of added water. These compositions can be stored at ambient temperature and used up to three months or more from date of manufacture. They can be cured to a hard cross-linked mass solely by the addition of water as described above and illustrated in the examples.

The term "shelf-life" (prior to water addition) is used to describe the period for which such materials may be stored and subsequently cured by the addition of water. During the "shelf-life" period the compositions described in general increase in viscosity and thicken appreciably with time but they are still stirrable and usable in practice.

In the following examples, Examples 1–10 primarily illustrate compositions in which resin components and initiators have been varied. Examples 11, 12 and 13 illustrate compositions in which the proportion of cement has been varied; in these examples the water to cure the composition represents 22.5 parts water by weight per 100 parts of cement. Example 14 illustrates the effect of storage at ambient temperature for periods up to 4 months, on the properties of a typical composition when water is added to cure it, the water in all other examples being added to freshly prepared samples within 1 to 2 hours of mixing. Examples 15 and 16 illustrate typical compositions cured using proportions of water varying from 5.625 percent to 33.75 percent by weight based on the cement. Example 17 illustrates the effect on a typical composition of the presence of varying quantities of a conventional polyester inhibitor, hydroquinone.

Conventional inhibitors for polyesters in styrene or other unsaturated copolymerizable monomer solution are quinones, substituted quinones, hydroquinones, substituted hydroquinones and certain amines. They are present for two main reasons—firstly to prevent premature gelation on storage and secondly to control the gel-time of the polyesters when an accelerator/promoter is added, to cure it. Typical accelerator/promoter systems of the prior art are organic oil soluble peroxides or hydroperoxides with multivalent metal soaps such as cobalt, or acyl peroxides with an aromatic amine, for example dimethyl aniline.

In compositions according to the present invention, however, conventional polyester/styrene inhibitors, for example hydroquinones, do not exert the same order of influence on either the curing properties or the storage stability properties of such compositions, compared with their influence on conventionally catalysed polyesters.

Examples 18 to 23 illustrate the use of various cements in compositions according to the present invention.

EXAMPLE 1

|  | Parts by weight |
|---|---|
| Polyester resin reaction product of 2 moles phthalic anhydride, 1 mole maleic anhydride, 2.15 moles propylene glycol, 1.15 moles diethylene glycol, condensed to an acid value of 28–30 milligrams KOH/gram and containing 750 p.p.m. hydroquinone | 37.2 |
| Styrene monomer | 22.8 |
| Powdered ammonium persulphate | 2.0 |
| Portland cement milled with stearic acid | 40.0 |

Shelf-life (prior to water additions)

The above mix was a free flowing thin paste which on storage at ambient temperatures (18–20° C.) gradually thickened. The suspended solids tended to settle out on long standing but the sediment could be redispersed at any time during this period. Several batches of this resin were tested in this formulation. Generally, the compositions were stirrable and usable after three months storage at ambient temperatures (18–20° C.), some batches being usable after six to nine months' storage.

Compositions with subsequent water additions (a) 9 parts by weight of water were added to the compositions as described above and stirred in thoroughly until homogeneous. The compositions thickened gradually and after 70–120 minutes at ambient temperature (18–20° C.) could not be spread. The composition further hardened to rubbery products and eventually to a hard, cross-linked mass within 24 hours.

(b) 9 parts by weight of water and 250 parts by weight of fine sand (mesh size 60#) were added to a composition as described in Example 1 and thoroughly mixed in. The mix was spread and tamped to compact it into 1 in. x 1 in. x 1 in. stainless steel cube moulds which had previously been treated with a suitable release agent, silicone grease. The moulds were placed at 25° C. for various lengths of time. Cubes were demoulded and tested for compression strength tests on a constant rate of loading instrument at a rate of 4,400 lbs./minute. Results obtained are given in Table 1.

*Table 1.—1 in. cube compression strength test data*

| Age (days): | Cube compression strength,[1] p.s.i. |
|---|---|
| 1 | 1,500–2,000 |
| 3 | 2,000–2,500 |
| 7 | 3,000–3,500 |
| 28 | 3,500–4,500 |

[1] Rate of loading 4,400 lbs./min.

(c) 50 parts by weight blue flint grit No. 3, 150 parts by weight blue flint grit No. 5, and 9 parts by weight water were added to the composition described in Example 1 and thoroughly mixed in. This material was then trowelled onto a wire-brushed exposed aggregate concrete slab to a nominal thickness of ¼ inch and allowed to cure for seven days. 2½ inch diameter cores were drilled through the topping and just into the concrete substrate. Suitable 2½ inch diameter metal caps were bonded carefully onto the cores and a vertical pull was exerted on the cores via the metal caps by a constant rate of deformation instrument while the concrete slab was firmly and immovably clamped. Test specimens failed under an increasing load applied at 0.02 in. per minute pulling rate. The pull-off strength registered varied but was in general greater than 100 p.s.i. Failure in general occurred wholly or substantially within the concrete slab indicating a bond strength at the topping—concrete interface higher than the tensile strength of the concrete. Similar results were obtained when the concrete substrate had been wetted thoroughly by water before the topping was applied.

(d) 9 parts by weight of water were added to the composition described in Example 1 and thoroughly mixed in. This was then poured into a stainless steel open top mould approximately 18 ins. long with 1 in. square cross section previously treated with a release agent, silicone grease. The mould was allowed to stand at ambient temperature for 24 hours. Hardened specimens were demoulded and their lengths measured using accurate calipers (accurate to 1/1000 in.) at various times. From these measurements the linear shrinkage on cure was calculated. Results obtained are given in Table 2.

Table 2.—Effect of curing period on linear shrinkage

| Age (days): | Linear shrinkage,[1] percentage |
|---|---|
| 1 | 0.43 |
| 3 | 0.67 |
| 7 | 0.76 |
| 28 | 0.95 |

[1] $\left(\frac{L_0-L}{L_0}\times 100\right)$ $L_0$ = internal length of mould.
$L$ = length of specimen.

EXAMPLE 2

| | Parts by weight |
|---|---|
| Polyester resin reaction product of 1 mole maleic anhydride and 2 moles phthalic anhydride with 3.225 moles propylene glycol and 0.019 mole polyethylene glycol having an average molecular weight of 1000 with an upper molecular weight limit of 1050 and a lower molecular weight limit of 950 condensed to an acid value of 28–30 milligrams KOH/gram and containing 450 p.p.m. hydroquinone | 37 |
| Styrene monomer | 23 |
| Powdered ammonium persulphate | 2 |
| Portland cement milled with stearic acid | 40 |

Shelf-life (prior to water addition)

The above mix formed a free flowing paste which on storage at ambient temperature (18–20° C.) gradually thickened during one month storage but remained stirrable by hand and usable. Similar mixes using various batches of this resin in general thickened and eventually formed a rubbery gel between one and two months.

Compositions with subsequent water additions (a) 9 parts by weight of water were added to the above composition and thoroughly mixed in. The mix thickened and became too thick to spread in approximately 30 minutes at ambient temperature (18–20° C.). At 5 hours it had formed a hard but flexible mass which by 24 hours was very hard and tough.

Shrinkage measurements were carried out on this composition with 9 parts by weight added water as described in Example 1(d). Results were as given in Table 3.

Table 3.—Effect of curing period on linear shrinkage

| Age: | Linear shrinkage [1] (percent) |
|---|---|
| 5 hours | 1.24 |
| 1 day | 1.44 |
| 5 days | 1.49 |
| 7 days | 1.52 |
| 28 days | 1.72 |

[1] $\left(\frac{L_0-L}{L_0}\times 100\right)$ $L_0$ = internal length of mould.
$L$ = length of specimen.

(b) 250 parts by weight of fine sand (mesh size 60#) and 9 parts by weight of water were added to the composition described before and thoroughly mixed in. 1 in. cubes were prepared and tested as described in Example 1(b). Results obtained are given in Table 4.

Table 4.—1 in. cube compression strength test data

| Age (days): | Compression strength,[1] p.s.i. |
|---|---|
| 1 | 4,600 |
| 3 | 5,000 |
| 7 | 5,300 |
| 28 | 6,000 |

[1] Rate of loading 4,400 lbs./min.

EXAMPLE 3

| | Parts by weight |
|---|---|
| Polyester resin reaction product of 2 moles phthalic anhydride, 1 mole maleic anhydride, 2.15 moles propylene glycol, 1.15 moles diethylene glycol, condensed to an acid value of 28–30 milligrams KOH/gram and containing 750 p.p.m. hydroquinone | 37 |
| Styrene monomer | 23 |
| Powdered ammonium persulphate | 2 |
| Powdered sodium meta-bisulphite | 0.2 |
| Portland cement milled with stearic acid | 40 |

Shelf-life (prior to water additions)

The above mix was a free flowing paste which on storage at ambient temperature thickened gradually but was stirrable by hand after 2 months. At 3 months it was too thick to stir by hand but had not gelled.

(A similar composition made up without the sodium meta-bisulphite also thickened but was stirrable by hand for up to 4–5 months at ambient temperature (18–20° C.).)

Compositions with subsequent water additions (a) The composition containing sodium meta-bisulphite was thoroughly mixed with 9 parts by weight of water. The mix was spreadable up to 35 minutes and eventually cured to a hard, tough solid with 24 hours.

(A similar test done on the composition without sodium metabisulphite remained spreadable for 90 minutes and cured to a hard but flexible material within 24 hours. At 48 hours this also was hard and tough.)

EXAMPLE 4

| | Parts by weight |
|---|---|
| Polyester resin reaction product of 2 moles phthalic anhydride, 1 mole maleic anhydride, 2.15 moles propylene glycol and 1.15 moles diethylene glycol condensed to an acid value of 28–30 milligrams KOH/gram and containing 750 p.p.m. hydroquinone | 37 |
| Styrene monomer | 23 |
| Powdered sodium persulphate | 2 |
| Powdered sodium metabisulphite | 0.2 |
| Portland cement milled with stearic acid | 40 |

Shelf-life (prior to water additions)

The above mix was a free flowing paste which on storage at ambient temperature (18–20° C.) gradually thickened but was stirrable for a period up to 6 months. On longer storage the mix became too thick to stir by hand but had not gelled in 10 months.

Compositions with subsequent added water 9 parts by weight of water were added to the mix described above and thoroughly stirred in. The mix thickened until it could not be spread after 80 minutes. At 24 hours a hard but flexible product had formed. At 48 hours this mix was quite tough and inflexible.

EXAMPLE 5

| | Parts by weight |
|---|---|
| Polyester resin based on 2 moles phthalic anhydride, 1 mole maleic anhydride, 1 mole propylene glycol and 2 moles ethylene glycol condensed to an acid value of 40 milligrams KOH/gram and containing 225 p.p.m. hydroquinone | 37 |
| Styrene monomer | 23 |
| Powdered ammonium persulphate | 2 |
| Portland cement milled with stearic acid | 40 |

Shelf-life (prior to water additions)

The above mix was a smooth, free flowing paste which on storage at ambient temperature (18–20° C.) thickened slowly over 3 months. It was thicker but still stirrable by hand at 6 months, but was too thick to stir by hand at 12 months although it had not gelled.

Composition with subsequent water addtion 9 parts by weight of water were added and thoroughly stirred in to this composition. It thickened and could not be spread after 35 minutes. It hardened to a tough, flexible mass at 24 hours and to a hard, tough and inflexible mass at 48 hours.

EXAMPLE 6

| | Parts by weight |
|---|---|
| Polyester resin based on 2 moles phthalic anhydride, 1 mole maleic anhydride and 3 moles propylene glycol condensed to an acid value of 40 milligrams KOH/gram and containing 300 p.p.m. hydroquinone | 36 |
| Styrene monomer | 24 |
| Powdered ammonium persulphate | 2 |
| Portland cement milled with stearic acid | 30 |

Shelf-life (prior to water additions)

The above mix was a free flowing paste which did not thicken appreciably on storage at ambient temperature over 2 months. As a consequence of this the suspended solids tended to settle out to a sediment which required redispersion. On redispersion by hand and further storage the mix thickened until at 4 months it was appreciably thicker but still stirrable by hand and remained like this for up to 8 months.

Composition on subsequent water addition 9 parts by weight of water were added to this composition and thoroughly stirred in. The composition could not be spread after 50 minutes. At 24 hours it was soft and pliable. At 3 days it had cured to a hard, tough mass.

EXAMPLE 7

| | Parts by weight |
|---|---|
| Polyester resin reaction product of 1.5 moles phthalic anhydride, 1.5 moles maleic anhydride, 1 mole propylene glycol, 2 moles ethylene glycol, condensed to an acid value of 40 milligrams KOH/gram and containing 225 p.p.m. hydroquinone | 37 |
| Styrene monomer | 23 |
| Powdered ammonium persulphate | 2 |
| Portland cement milled with stearic acid | 40 |

Shelf-life (prior to water additions)

The above composition was a free flowing paste which on storage at ambient temperature (18–20° C.) thickened appreciably within 3 weeks. At this stage it was still stirrable by hand and it remained like this up to 4 months. At 6 months it was too thick to stir by hand but had not gelled.

Composition with subsequent water addition 9 parts by weight of water were stirred into this composition. The composition thickened and could not be spread after 32 minutes. Within 24 hours it had cured to a hard, slightly flexible material which at 48 hours was hard, tough and inflexible.

EXAMPLE 8

| | Parts by weight |
|---|---|
| Polyester resin reaction product of 1 mole maleic anhydride, 2 moles phthalic anhydride, 2.15 moles propylene glycol and 1.15 moles diethylene glycol condensed to an acid value of 28 milligrams KOH/gram and containing 750 p.p.m. hydroquinone | 37 |
| Vinyl toluene | 23 |
| Powdered ammonium persulphate | 2 |
| Portland cement milled with stearic acid | 40 |

Shelf-life (prior to water additions)

The composition was a free flowing paste which on storage at ambient temperature (18–20° C.) gradually thickened during 1 week. After 5 weeks the composition was thick but still stirrable by hand. After 8 weeks it had stiffened so much that it was very difficult to stir by hand. It had, however, not gelled.

Composition with subsequent water addition 9 parts by weight of water were stirred into this composition at ambient temperature (18–20° C.). The mix thickened and could not be spread after 60 minutes and was hard but slightly flexible at 24 hours. At 48 hours it was tough and inflexible.

EXAMPLE 9

| | Parts by weight |
|---|---|
| Polyester resin reaction product of 2 moles phthalic anhydride, 1 mole fumaric acid, 3.225 moles propylene glycol and 0.019 mole polyethylene glycol having an average molecular weight of 1000 with an upper molecular weight limit of 1050 and a lower molecular weight limit of 950 condensed to an acid value of 28 milligrams KOH/gram and containing 450 p.p.m. hydroquinone | 37 |
| Styrene monomer | 23 |
| Powdered ammonium persulphate | 2 |
| Portland cement milled with stearic acid | 40 |

Shelf-life (prior to water additions)

The composition was a free flowing paste which on storage at ambient temperature (18–20° C.) gradually thickened over 1 month, but was stirrable by hand and usable. After 2 months the mix was too thick to stir by hand but had not gelled.

Composition with subsequent water addition 9 parts by weight of water were stirred into this composition. It thickened and could not be spread after 25 minutes. After 24 hours it was hard and tough.

EXAMPLE 10

| | Parts by weight |
|---|---|
| Polyester resin reaction product of 1 mole maleic anhydride, 2 moles phthalic anhydride with 3.225 moles propylene glycol and 0.019 mole polypropylene glycol having an average molecular weight of 1025 with an upper molecular weight limit of 1075 and a lower weight limit of 975 condensed to an acid value of 28 milligrams KOH/gram and containing 450 p.p.m. hydroquinone | 36 |
| Styrene monomer | 24 |
| Powdered ammonium persulphate | 2 |
| Portland cement milled with stearic acid | 40 |

Shelf-life (prior to water additions)

The above composition was a free flowing paste which on storage at ambient temperature (18–20° C.) thickened slightly over 1 month. The sediment formed was vigorously redispersed by hand and the composition remained in this state for a further 5 months without becoming too thick to stir by hand.

Composition with subsequent water addition 9 parts by weight of water were thoroughly stirred into the above composition. It gradually thickened and after 60 minutes could not be spread. After 24 hours it had formed a rubbery, flexible material which hardened to a tough, hard state over 3 days.

EXAMPLE 11

| | Parts by weight |
|---|---|
| Polyester as described in Example 1 | 49.6 |
| Styrene monomer | 30.4 |
| Powdered ammonium persulphate | 2.0 |
| Portland cement milled with stearic acid | 20 |

Shelf-life (prior to water additions)

The above mix was a free flowing, thin paste which on storage at ambient temperature (18–20° C.) for one month slowly separated out to a clear resin top layer and a sediment. The sediment was redispersed by vigorous hand stirring to reform a paste which was only slightly thicker than when freshly made up. On subsequent storage at ambient temperature (18–20° C.) for a further 6 months a sediment reformed which could be redispersed by vigorous hand stirring at any stage throughout this period. The reformed paste had gradually thickened over this period was was still stirrable by hand and usable in practice.

Compositions with subsequent water additions 4.5 parts by weight of water were added to the freshly made composition as described above and stirred in thoroughly until homogeneous. The composition thickened gradually and after 160 minutes at ambient temperature (18–20° C.) could not be spread easily by hand.

During this period the composition was stirred by hand at intervals of approximately 20 minutes to prevent the formation of a sticky resinous layer at the surface. A cast was poured approximately 120 minutes after the water addition and allowed to stand at ambient temperature (18–20° C.). After 24 hours the cast was rubbery with a surface tackiness. The cast hardened further until after 3 days it was hard and tough though slightly flexible and still retained some surface tackiness.

EXAMPLE 12

| | Parts by weight | | | |
|---|---|---|---|---|
| | (A) | (B) | (C) | (D) |
| Polyester resin as described in Example 1 but condensed to an acid value of 24 milligrams KOH/gram | 37 | 37 | 37 | 37 |
| Styrene monomer | 23 | 23 | 23 | 23 |
| Powdered ammonium persulphate | 2 | 2 | 2 | 2 |
| Portland cement mixed with stearic acid | 40 | 30 | 20 | 10 |
| Water (for subsequent curing) | 9 | 6.75 | 4.5 | 2.25 |

Shelf-lives (prior to water addition)

The above compositions were free flowing pastes at ambient temperature of decreasing viscosity with decreasing Hydracrete content. On storage at ambient temperature (18-20° C.):

Examples 12(A) and 12(B) thickened gradually and were too thick to stir by hand and use after 2–3 months. Examples 12(C) and 12(D) separated to a clear resin surface layer and a sediment within one week. The sediments were redispersed by vigorous hand stirring at intervals of 1–3 weeks. After six months storage both these examples had thickened but were still easily stirred and spread by hand, Example 12(D) being thin enough to pour after redispersion of the sediment.

Compositions with subsequent water additions

Quantities of water were thoroughly stirred into these compositions at ambient temperature (18–20° C.) as shown. The pot lives or time from the addition of the water until the compositions became too thick to spread easily by hand are given in Table 5.

Table 5.—Pot lives data on Compositions 12(A), 12(B), 12(C) and 12(D)

| Composition: | Pot life [1] |
|---|---|
| 12(A) | 30 |
| 12(B) | 33 |
| 12(C) | 37 |
| 12(D) | 84 |

[1] In minutes at 18–20° C.

Compositions 12(A) and 12(B) hardened to tough solids after 24 hours. Composition 12(C) was slightly flexible after 24 hours but hard and tough at 48 hours. Composition 12(D) was hard but rubbery at 24 hours but hardened further to a hard, brittle solid at 48 hours.

EXAMPLE 13

| | Parts by weight | |
|---|---|---|
| | (A) | (B) |
| Polyester Resin as described in Example 2 | 37 | 37 |
| Styrene monomer | 23 | 23 |
| Powdered ammonium persulphate | 2 | 2 |
| Portland cement milled with stearic acid | 20 | 10 |

Shelf-life (prior to water additions)

The above compositions were thin, free flowing pastes which on storage at ambient temperature (18–20° C.) formed sediments within one week. The sediments were redispersed by vigorous hand stirring to reform thin pastes. The compositions continued settling to form sediments which could be redispersed by hand for about 3 months at which time they formed pastes which were thicker than when freshly made but were still pourable and usable.

Compositions with subsequent water additions 4.5 parts by weight of water were added to composition 13(A) and thoroughly stirred in at ambient temperature (18–20° C.). The paste gradually thickened and could not be spread by hand after 38 minutes. After 24 hours it had hardened to a hard, brittle solid.

2.25 parts by weight of water were added to composition 13(B) and thoroughly stirred in at ambient temperature (18–20° C.). The mixture thickened and became too thick to spread by hand after 87 minutes. After 24 hours it had formed a hard, brittle solid with a very tacky surface.

EXAMPLE 14

| | Parts by weight |
|---|---|
| Polyester resin as described in Example 1 | 37.2 |
| Styrene monomer | 22.8 |
| Powdered ammonium persulphate | 2 |
| Portland cement milled with stearic acid | 40 |

Shelf-life (prior to water additions)

The above mix was a free flowing thin paste which on storage at ambient temperature (18–20° C.) gradually thickened but remained stirrable by hand for four months.

Compositions with subsequent water additions

Samples of this composition were tested after storage at ambient temperatures by mixing-in 9 parts by weight of water into each. The pot lives at ambient temperature (as defined in Example 12) were measured and are described in Table 6.

*Table 6.—Pot lives of compositions after storage at ambient temperature (18–20° C.)*

Storage period at (18–20° C.):         Pot life [1]
- 1 day _____ 70
- 1 month _____ 85
- 2 months _____ 90
- 3 months _____ 90
- 4 months _____ 90

[1] In minutes at 18–20° C.

Samples stored 1 month or more were appreciably thicker than the fresh sample prior to water additions. On addition of water, however, each stored sample became immediately thinner and then gradually thickened thereafter and became too thick to spread by hand in the periods given in Table 6.

24 hours after addition of water all samples became hard and tough.

EXAMPLE 15

Parts by weight
- Polyester resin as described in Example 1 _____ 37
- Styrene monomer _____ 23
- Powdered amonium persulphate _____ 2
- Portland cement milled with stearic acid _____ 40

Shelf-life (prior to water aditiond)

Storage properties at ambient temperature (18–20° C.) were as described in Example 1.

Compositions with subsequent water addition (a) Varying quantities of water were added to the composition described above at ambient temperature. The pot lives at ambient temperature (18–20° C.) (defined in Example 12) were measured and are given in Table 7.

*Table 7.—Compositions cured with varying levels of water*

Water addition, parts by weight:         Pot life [1]
- 2.5 _____ 80
- 4.5 _____ 60
- 9.0 _____ 75
- 13.5 _____ 90

[1] At ambient temperature (18–20° C.), minutes.

The composition containing 2.5 and 4.5 parts by weight of water were hard and tough after 24 hours. The composition containing 9 parts by weight of water was more flexible at 24 hours but hard and tough in 36 hours. The composition containing 13.5 parts by weight of water was rubbery at 24 hours, still had some flexibility at 48 hours but became tough after 3 days.

(b) 250 parts by weight of 60 mesh fine sand and varying quantities of water as given in Table 7 were added to the composition described before and were thoroughly mixed in. One-inch cubes were prepared and tested for compression strength. Results obtained are given in Table 8.

*Table 8.—One-inch cube compression strength test data using varying amounts of water*

| Age (days) | Compression Strength, p.s.i. (rate of loading, 4,400 lbs./min.) | | | |
|---|---|---|---|---|
| | 2.5 parts water | 4.5 parts water | 9 parts water | 13.5 parts water |
| 1 | 6,295 | 6,025 | 2,900 | 2,075 |
| 3 | 7,014 | 5,990 | 3,540 | 2,337 |
| 7 | 7,660 | 6,670 | 3,630 | 2,518 |

(c) Linear shrinkage measurements were made on compositions containing varying amounts of water as given in Table 7. Results are given in Table 9.

*Table 9.—Effect of curing period on linear shrinkage using varying amounts of water*

| Age (days) | Linear Shrinkage [1] | | | |
|---|---|---|---|---|
| | 2.5 parts water | 4.5 parts water | 9 parts water | 13.5 parts water |
| 1 | 0.43 | 0.38 | 0.29 | 0.48 |
| 3 | 0.68 | 0.53 | 0.58 | 0.84 |
| 7 | 0.71 | 0.60 | 0.76 | 0.93 |

[1] $\left(\frac{L_0 - L}{L_0} \times 100\right)$.
$L_0$ = internal length of mould.
$L$ = length of specimen.

EXAMPLE 16

Parts by weight
- Polyester resin as described in Example 2 _____ 37
- Styrene monomer _____ 23
- Powdered ammonium persulphate _____ 2
- Portland cement milled with stearic acid _____ 40

Shelf-life (prior to water addition)

The storage properties of this composition at ambient temperature were as described in Example 2.

Compositions on subsequent water additions

Varying quantities of water were added to the composition described above and thoroughly stirred in. Pot life data are given in Table 10.

*Table 10.—Pot life data after various water additions*

Water addition, parts by weight         Pot life [1]
- 2.5 _____ 34
- 4.5 _____ 25
- 9.0 _____ 25
- 13.5 _____ 50

[1] At ambient temperature (mins.).

In each case the compositions cured to extremely hard, tough inflexible masses after 24 hours.

EXAMPLE 17

Parts by weight
- Polyester resin produced from on 2 moles phthalic anhydride, 1 mole maleic anhydride, 2.97 moles propylene glycol, 0.03 mole polyethylene glycol having an average molecular weight of 1000 with an upper molecular weight limit of 1050 and a lower molecular weight limit of 950 condensed to an acid value of 40 milligrams KOH/gram __ 36.5
- Styrene monomer _____ 23.5
- Powdered ammonium persulphate _____ 2
- Portland cement milled with stearic acid _____ 40

Quantities of hydroquinone varying from 300 parts per million to 1,000 parts per million in 100 p.p.m. lots based on the combined weight of polyester resin and unsaturated monomer (styrene) were additionally used. A composition as above was made up with each of these polyester samples so that the resin contained varying amounts of inhibitor.

Shelf-life (prior to water addition)

Each sample was found to have almost identical storage stability properties at ambient temperature (18–20° C.). Smooth free flowing pastes were produced which on storage at ambient temperature gradually thickened over a period of 4 weeks but were easily stirred by hand. At 8 weeks the compositions had become thicker and possessed some thixotropic properties yet were easily stirred by hand. They remained in this state for up to 12 weeks and finally formed a rubbery gel sometime between 12 and 16 weeks' storage.

Compositions on subsequent water additions 9 parts by weight of water were added to each of the compositions described above and thoroughly stirred in.

Data on the pot lives of these compositions after water addition (as defined in Example 12) are given in Table 11.

Table 11.—Pot life data on compositions containing varying hydroquinone levels after water additions Hydroquinone Level (p.p.m.), based on weight
of polyester and styrene:                              Pot life [1]
    300 ------------------------------------------  50
    400 ------------------------------------------  52
    500 ------------------------------------------  55
    600 ------------------------------------------  56
    700 ------------------------------------------  60
    800 ------------------------------------------  70
    900 ------------------------------------------  74
    1,000 ----------------------------------------  75

[1] At ambient temperature (18–20° C.), minutes.

The compositions containing 300–700 p.p.m. hydroquinone all gave hard and brittle products after 24 hours. Compositions with 800–1,000 p.p.m. hydroquinone gave slightly softer products after 24 hours but after 48 hours were also hard and brittle.

EXAMPLES 18–23

| | Parts by weight |
|---|---|
| Polyester resin as described in Example 1 | 37.2 |
| Styrene monomer | 22.8 |
| Cement as specified hereunder | 40.0 |
| Powdered ammonium persulphate | 2.0 |

The various products resulting from the individual cement compositions of these examples, exhibited varied properties but were all of a useful nature serving the objects of the invention individually.

(a) Storage life (prior to water addition)

In order to accelerate any changes which could take place during storage, the products of Examples 18 to 23 were stored at a temperature of 40° C.±2° C. for 150 hours, after which they were examined with the results shown in Table 12.

(b) Strength of compositions after addition of water

One hundred parts in each case, of the several products of Examples 18 to 23 were mixed with 50 parts by weight of Blue flint grit No. 3 (¼-inch mesh) and 9 parts by weight Blue flint grit No. 5 (⅛-inch mesh) and 9 parts by weight of water. The six compositions thus produced were each then used to fill steel moulds of 2.78 inches cubes. These were maintained at room temperature for 24 hours after which compression tests yielded the results shown in Table 12 as an average of 3 cubes in each test.

Table 12

| Ex. | Cement | Storage Test (a) | Compression Test (b), p.s.i. |
|---|---|---|---|
| 18 | Portland cement milled with stearic acid. | No change; settled cement readily dispersed. | 3,010 |
| 19 | Ordinary Portland to BS 12: 1958. | Some increase in viscosity; settled cement difficult to re-disperse. | 3,020 |
| 20 | White portland cement complying with physical strength requirements of BS 12: 1958. | Significant increase in viscosity; settled cement very difficult to re-disperse. | 2,280 |
| 21 | Portland blast furnace cement to BS 146. | No change; settled cement difficult to re-disperse. | 3,260 |
| 22 | High alumina cement to VS 915. | Low viscosity; settled cement very difficult to re-disperse. | 1,775 |
| 23 | Sulphate resisting portland cement to BS 4027. | Slight increase in viscosity; settled cement difficult to re-disperse. | 3,160 |

The cementitious compositions of the present invention offer substantial advantages in a wide variety of applications besides the production of concrete and mortar. Surfacings, toppings, patchings and markings, for roads and concrete floors, roofs, and the like; coverings for metal, hardwood and other wet or dry surfaces, particularly for reinforcements to be used in concrete; grouts, moulded castings and laminates, are all representative of purposes in which advantage may be taken of the outstanding properties of the compositions, such as resistance to chemical attack to which cement is normally susceptible, extra strength and adhesion and pleasing and varied appearance without efflorescence and in any colour. At the same time the compositions merely require mixing with water at ambient temperature.

I claim:

1. A process of preparing a polyester cementitious composition which comprises adding water to a stable, substantially water-free copolymerizable mixture comprising approximately 50 to 70 parts by weight of polymerizable, unsaturated polyester resin obtained by reacting a mixture of phthalic anhydride and maleic anhydride with diethylene glycol, 25 to 65 parts by weight of monomeric styrene, 80 to 150 parts by weight of portland cement, and 3 to 5 parts by weight of powdered ammonium persulphate, 1–3 parts by weight of powdered sodium bisulphite and an effective amount of an inhibitor to prevent premature reaction of said polyester and monomer.

2. A process of preparing a polymeric cementitious composition having a pH above 7 which comprises providing a stable, substantially water-free copolymerizable mixture comprising polymerizable, ethylenically unsaturated polyesters obtained by reacting polycarboxylic acids or the anhydrides thereof and polyhydric alcohols or aliphatic oxides, wherein at least one of the reactants contains ethylenic unsaturation, a monomeric ethylenically unsaturated crosslinking agent compatible with and reactive with said polyesters, hydraulic cement sufficiently alkaline in the presence of water to produce aqueous alkaline conditions, and an effective amount of a water-soluble free-radical-forming copolymerization initiator, said initiator being substantially insoluble in said monomeric crosslinking agent and polyesters and being effective for initiating the copolymerization of the monomer and polyesters under aqueous alkaline conditions; and an effective amount of an inhibitor to prevent premature reaction of said polyester and monomer; and adding to said mixture water in an amount sufficient for the hydration of said hydraulic cement and to provide the aqueous alkaline conditions in said mixture required to render said initiator effective for initiating the copolymerization of the monomer and polyesters.

3. The process of claim 2 in which the hydraulic cement is from 2% to 200% by weight of the combined polyesters and monomer.

4. The process of claim 2 in which the hydraulic cement is from 15% to 65% by weight of the mixture.

5. The process of claim 2 further characterized in that the water is added to the copolymerizable mixture in an amount ranging from about 5% to 25% by weight of the hydraulic cement.

6. The process of claim 2 further characterized in that the hydraulic cement is portland cement.

7. The process of claim 2 further characterized in that the hydraulic cement has been rendered oleophilic by treatment with a fatty acid.

8. The process of claim 2 in which said crosslinking agent is styrene.

9. The process of claim 2 in which said crosslinking agent is vinyl toluene.

10. The process of claim 2 further characterized in that the water-soluble free-radical-forming copolymerization initiator comprises the ammonium, sodium or potassium salt of persulphuric acid.

11. The process of claim 2 further characterized in that the water-soluble free-radical-forming copolymerization initiator comprises the combination of the ammonium or the sodium salt of persulphuric acid with sodium metabisulphite.

12. A stable, polymeric, substantially water-free cementitious composition which comprises copolymerizable, ethylenically unsaturated polyesters obtained by reacting polycarboxylic acids or the anhydrides thereof and polyhydric alcohols or aliphatic oxides wherein at least one of the reactants contains ethylenic unsaturation, at least one monomeric ethylenically unsaturated cross-linking agent compatible with and reactive with said polyesters, hydraulic cement, an effective amount of a water-soluble free-radical-forming polymerization initiator; said initiator being substantially insoluble in the monomeric cross-linking agent and unsaturated polyesters and being capable of initiating polymerization of the monomeric cross-linking agent and the unsaturated polyesters under aqueous alkaline conditions; and an effective amount of an inhibitor to prevent premature reaction of said polyester and monomer; said hydraulic cement being sufficiently alkaline to render said composition alkaline upon the addition of water sufficient for the hydration of said hydraulic cement.

13. The composition of claim 12 further characterized in that the hydraulic cement is from 2% to 200% by weight of the combined polyesters and monomer.

14. The composition of claim 12 further characterized in that the hydraulic cement is from 15% to 65% by weight of the mxiture.

15. The composition of claim 12 in combination with water in an amount ranging from about 5% to 25% by weight of the hydraulic cement.

16. The composition of claim 12 further characterized in that the polycarboxylic acids are selected from the group consisting of maleic acid, fumaric acid, phthalic acid, and the anhydrides thereof, and isophthalic acid.

17. The composition of claim 16 further characterized in that the polyesters are obtained by reacting at least one polycarboxylic acid or the anhydrides thereof and polyhydric alcohols selected from the group consisting of ethylene glycol, diethylene glycol, propylene glycol, hexylene glycol, and pentaerythritol.

18. The composition of claim 17 further characterized in that the monomeric unsaturated crosslinking agent is selected from the group consisting of acrylic acid esters, methacrylic acid esters, maleic acid esters, fumaric acid esters, vinyl monomers and allyl monomers.

19. The composition of claim 12 further characterized in that said crosslinking agent is styrene.

20. The composition of claim 12 further characterized in that said crosslinking agent is vinyl toluene.

21. The composition of claim 12 further characterized in that the water-soluble free-radical-forming polymerization initiator comprises the ammonium, sodium or potassium salt of persulphuric acid.

22. The composition of claim 12 further characterized in that the water-soluble free-radical-forming polymerization initiator comprises the combination of the ammonium or the sodium salt of persulphuric acid with sodium metabisulphite.

References Cited

UNITED STATES PATENTS

| 2,827,385 | 3/1958 | Lyons | 106—90 |
| 3,240,736 | 3/1966 | Beckwith | 260—29.2 |
| 3,326,845 | 6/1967 | Arens et al. | 260—40 |

OTHER REFERENCES

Chemical Abstracts, American Chemical Society, vol. 53, pp. 14582*i*–14583*b* (Aug. 10, 1959), Italian Patent 585,721 (Nov. 26, 1958) Nino Serratrice.

DONALD E. CZAJA, *Primary Examiner.*

U.S. Cl. X.R.

106—90, 95; 260—28, 29.2, 30.8, 32.4, 40